United States Patent
Lu et al.

(10) Patent No.: US 10,296,307 B2
(45) Date of Patent: May 21, 2019

(54) METHOD AND SYSTEM FOR TEMPLATE EXTRACTION BASED ON SOURCE CODE SIMILARITY

(71) Applicant: International Business Machines Corporation, Armonk, NY (US)

(72) Inventors: Liang K S Lu, Beijing (CN); Teng Sun, Beijing (CN); Zhong Shi Wang, Shanghai (CN); Zhe Li Yu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 177 days.

(21) Appl. No.: 15/596,077

(22) Filed: May 16, 2017

(65) Prior Publication Data

US 2018/0336018 A1 Nov. 22, 2018

(51) Int. Cl.
*G06F 8/36* (2018.01)
*G06F 8/70* (2018.01)

(52) U.S. Cl.
CPC . *G06F 8/36* (2013.01); *G06F 8/70* (2013.01)

(58) Field of Classification Search
CPC .................................. G06F 8/36; G06F 8/70
See application file for complete search history.

(56) References Cited

U.S. PATENT DOCUMENTS

| | | | | |
|---|---|---|---|---|
| 6,088,739 A | * | 7/2000 | Pugh | G06F 9/4488 719/315 |
| 6,986,132 B1 | * | 1/2006 | Schwabe | G06F 8/52 717/166 |
| 7,761,848 B1 | | 7/2010 | Chaffin | |

(Continued)

FOREIGN PATENT DOCUMENTS

| CN | 103135976 | 6/2013 |
|---|---|---|
| CN | 104331285 | 2/2015 |

OTHER PUBLICATIONS

Template Method Design Pattern, https://sourcemaking.com/design_patterns/template_method, Oct. 2015 (Year: 2015).*

(Continued)

*Primary Examiner* — Jae U Jeon
*Assistant Examiner* — Douglas M Slachta
(74) *Attorney, Agent, or Firm* — George R. McGuire; Bond Schoeneck & King, PLLC; John Pivnichny

(57) ABSTRACT

The present invention is a system and method for template extraction based on source code similarity. The system receives source code and groups the class files into classes based on naming rules and inheritance hierarchy. Features are parsed for each class and encoded a float value. The classes are clustered based on similarities of the features. A similarity value is calculated for the classes in a cluster and potential candidate classes are selected based on the similarity value or inheritance hierarchy. A feature subset is selected across all candidate classes and differences in the features in the subset are determined. The features are then decoded and the differences are parameterized to generate a template. A variable definition file is created to cross-reference features and variables. Source code can then be generated using the template and the variable definition file.

20 Claims, 9 Drawing Sheets

(56) References Cited

U.S. PATENT DOCUMENTS

| | | | | |
|---|---|---|---|---|
| 7,941,438 | B2* | 5/2011 | Molina-Moreno | G06F 8/35 707/756 |
| 8,392,877 | B1* | 3/2013 | Chiluvuri | G06F 8/36 717/106 |
| 8,402,428 | B2 | 3/2013 | Alex | |
| 8,448,132 | B2* | 5/2013 | Lochmann | G06F 8/24 707/999.102 |
| 9,223,546 | B1 | 12/2015 | Chaffin | |
| 2003/0083900 | A1* | 5/2003 | Khriss | G06F 8/74 705/1.1 |
| 2004/0015832 | A1 | 1/2004 | Stapp et al. | |
| 2005/0097530 | A1* | 5/2005 | Asao | G06F 8/41 717/140 |
| 2007/0256069 | A1* | 11/2007 | Blackman | G06F 8/433 717/170 |
| 2011/0040390 | A1* | 2/2011 | Blevins | G05B 19/0426 700/18 |
| 2011/0088011 | A1* | 4/2011 | Ouali | G06F 8/10 717/105 |
| 2013/0268916 | A1* | 10/2013 | Misra | G06F 8/74 717/123 |
| 2017/0220544 | A1* | 8/2017 | Masson | G06F 3/04842 |
| 2017/0220545 | A1* | 8/2017 | Gururajan | G06F 17/248 |

OTHER PUBLICATIONS

Grbavac, "Improvement of Software Development Process with use of Template Generator", 8 pages.

Duric, et al., "A Source Code Similarity System for Plagiarism Detection", ACM Digital Library, http://dl.acm.org/citation.cfm?id= 2479381, 2 pages.

Park et al., "Detecting Source Code Similarity Using Code Abstraction", ACM Digital Library, http://dl.acm.org/citation.cfm?id= 2448630, 2 pages.

* cited by examiner

METHOD AND SYSTEM FOR TEMPLATE EXTRACTION BASED ON SOURCE CODE SIMILARITY

BACKGROUND

The present invention relates generally to source code generation, and more particularly to source code generation using extracted templates.

Code generation technology is commonly used to reduce the workload of project construction. Usually, the template files are extracted by experienced developers through manual review of earlier projects. However, as the technology and programming language is quickly evolving, it is challenging to build and maintain the template files with best practices for code generation. It is difficult to determine where to draw the line between a template and other reusable artifacts. It is also difficult to identify (or calculate), exact and reuse a template effectively. Further, it is challenging and to improve and evolve the template when development projects are ongoing.

Code generation software, such as the CodeSmith Generator, is a development tool that generates code based on existing templates or pre-defined configuration files in order to extract templates. CodeSmith Generator essentially is a template-driven source code generator that automates the creation of common application source code for any language. However, code generation software has significant drawbacks. Code generation software requires the template to be written manually. In addition, the template is generated for complete classes and for a piece of code to implement a specific function.

Some code generation software generates programming code based on created business classes and a selected template, but the template solutions are pre-defined. Other code generation software requires user input for code configuration information, loads pre-defined template files, and then fills the template to generate different type codes. However, in all of the above referenced code generation software, the template is pre-defined, i.e. created by the user, and not adaptable or reusable for several projects.

Therefore, there is a need for an evolving system and method of template extraction where templates are generated automatically and generated for a whole project, or several projects.

SUMMARY

The present invention is a system and method for template extraction based on source code similarity. The system includes a computer processor having a non-transitory memory containing program code for receiving source code having class files, such as project source code with object-oriented programming language, classifying the class files into classes based on at least one of naming rules and inheritance hierarchy, parsing a first group of features and a second group of features for each class, encoding each feature from the first group and the second group with a float value. The sequence of digits representing the float values is determined by a business rule for similarity calculation. The system also includes program code for clustering classes based on similarities of the first group of features, assigning a quantitative indicia for classes in a cluster, identifying candidate classes within the cluster based on at least one of the quantitative indicia and inheritance hierarchy, and selecting a feature subset across all candidate classes. The feature subset is selected based on a standard deviation calculated for each feature subset. The standard deviation measures the similarity of the float values for the features in the feature subset.

The system further includes program code for loading naming conventions and programming guides as reference materials, determining one or more differences in the features in the feature subset, decoding the features in the feature subset, assigning a variable to the differences in the features in the feature subset, importing a domain model, parameterizing the domain model with the variable, and generating a template with the domain model. The system can also include program code for generating a variable definition file, which includes a listing of each variable associated with the difference in features in the feature subset. The quantitative indicia can be a similarity value or a reference count. The similarity value is calculated with a vector space model and represents similarities between the second group of features of each class in a cluster. The first group of features in the embodiment described above includes at least one of class attributes, function signature, and body. The second group of features in the embodiment described above includes at least one of class definitions, attribute definitions, and method definitions.

In another embodiment, a method for template extraction based on source code similarity includes the steps of receiving source code having class files, classifying the class files into classes based on at least one of naming rules and inheritance hierarchy, parsing one or more features for each class, encoding each feature with a float value, clustering classes based on similarities of the features, assigning a quantitative indicia for classes in a cluster, identifying candidate classes within the cluster based on at least one of the quantitative indicia and inheritance hierarchy, selecting a feature subset across all candidate classes, determining one or more differences in the features in the feature subset, decoding the features in the feature subset, assigning a variable to the differences in the features in the feature subset, importing a domain model, parameterizing the domain model with the variable, generating a template with the domain model, generating a variable definition file with the variable cross-referenced with the differences in the feature, and generating source code using the template and the variable definition file.

In yet another embodiment, a computer program product provides template extraction based on source code similarity. The computer program includes a computer readable storage medium having program instructions embodied therewith. The computer readable storage medium is not a transitory signal per se. The program instructions are readable by a computer to cause the computer to perform a method including the steps of receiving source code having class files, classifying the class files into classes based on at least one of naming rules and inheritance hierarchy, parsing one or more features for each class, encoding each feature with a float value, clustering classes based on similarities of the features, assigning a quantitative indicia for classes in a cluster, calculating a similarity value between each class within a cluster, identifying candidate classes within the cluster based on the similarity value, selecting a feature subset across all candidate classes, determining one or more differences in the features in the feature subset, decoding the features in the feature subset, assigning a variable to the differences in the features in the feature subset, importing a domain model, parameterizing the domain model with the variable, and generating a template with the domain model. The template can be improved with the steps of either re-calculating the similarity value for the entire source code, or re-encoding a portion of the source code that has been modified and re-calculating the similarity value for the portion of the source code.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
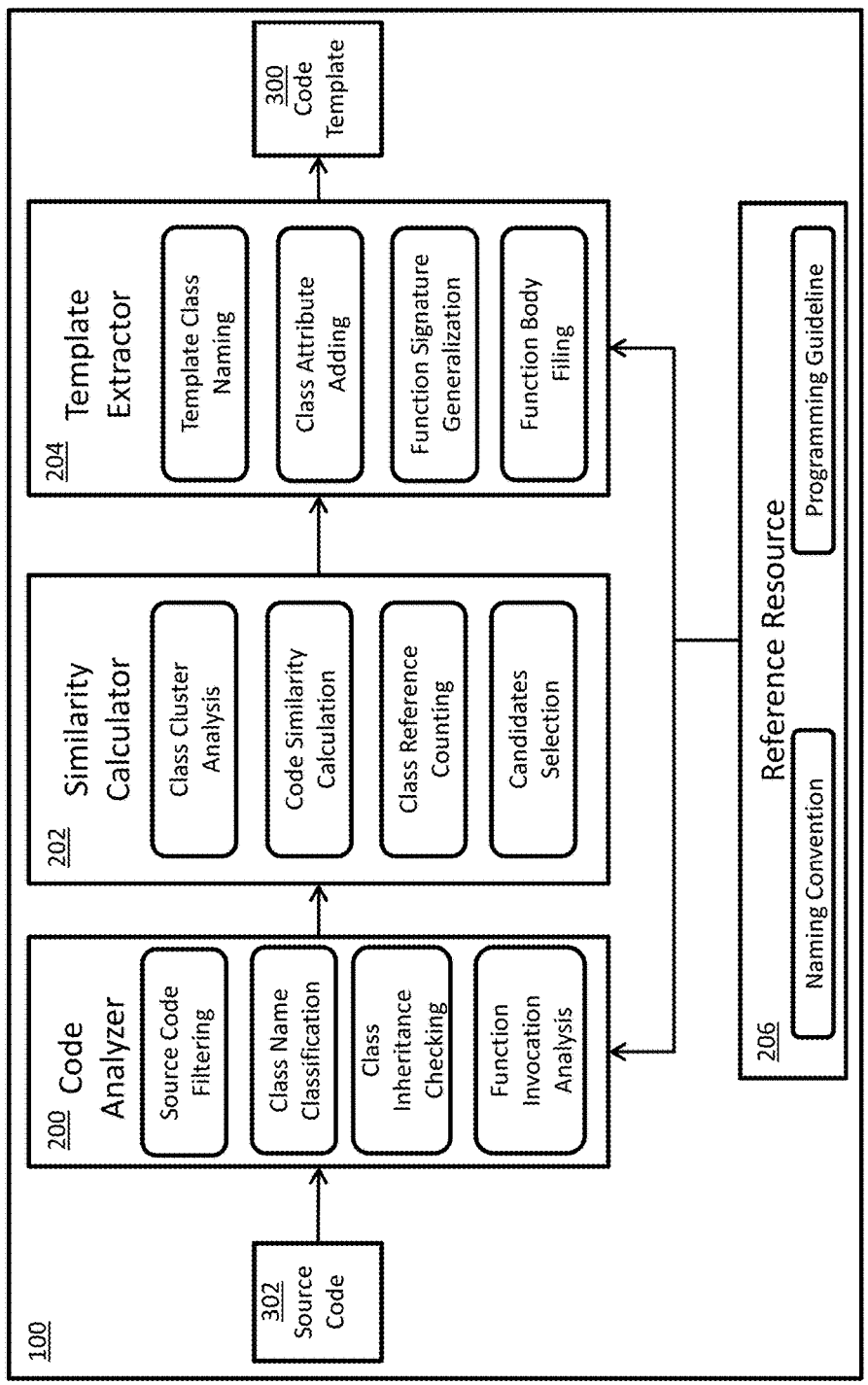
FIG. 1 is a conceptual diagram of a non-limiting illustrative embodiment of the system for template extraction based on source code similarity.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring again to the drawings, wherein like reference numerals refer to like parts throughout, there is seen in FIG. 1 a conceptual diagram of a non-limiting illustrative embodiment of the system for template extraction based on source code similarity. In the depicted embodiment, there is shown a computer system 100 comprising four modules: a "Code Analyzer" 200 module, "Similarity Calculator" 202 module, "Template Extractor" 204 module, and "Reference Resources" 206 module. The four modules of the computer system 100 are used to extract a code template 300 from source code 302.

The Code Analyzer 200 receives and filters input source code 302. In one embodiment, the input is project source code 302 written with object-oriented programming language (e.g., Java). The web pages, configure files, scripts, libraries, and other binary files (e.g., images) are excluded. The Code Analyzer 200 then loads reference resources from the Reference Resource 206 and groups the class files into classes with naming rules and in accordance with any inheritance hierarchy.

The Similarity Calculator 202 receives classes from the Code Analyzer 200 and clusters the classes by comparing class attributes, function signatures, and body. The Similarity Calculator 202 then assigns quantitative indicia to each class, such as a similarity value calculated between classes in a cluster and a reference count, i.e., the number of references for each class. Finally, the Similarity Calculator 202 selects template candidates. There are three types of template candidates, candidates selected based on high similarity, based on parent-child relationship, and based on high reference count. These three types of template candidates are explained more in depth later, with reference to FIG. 5.

The Template Extractor 204 then analyzes the template candidates and identifies variables in the class based on class hierarchy and similarity. The Template Extractor 204 then generalizes the function signature and generates the template files 300. Finally, the Reference Resource 206 shown in FIG. 1 contains the naming convention and programming guidelines. Thus, the Reference Resource 206 provides the metadata and rules for analysis and template 300 generation.

Figure 2:
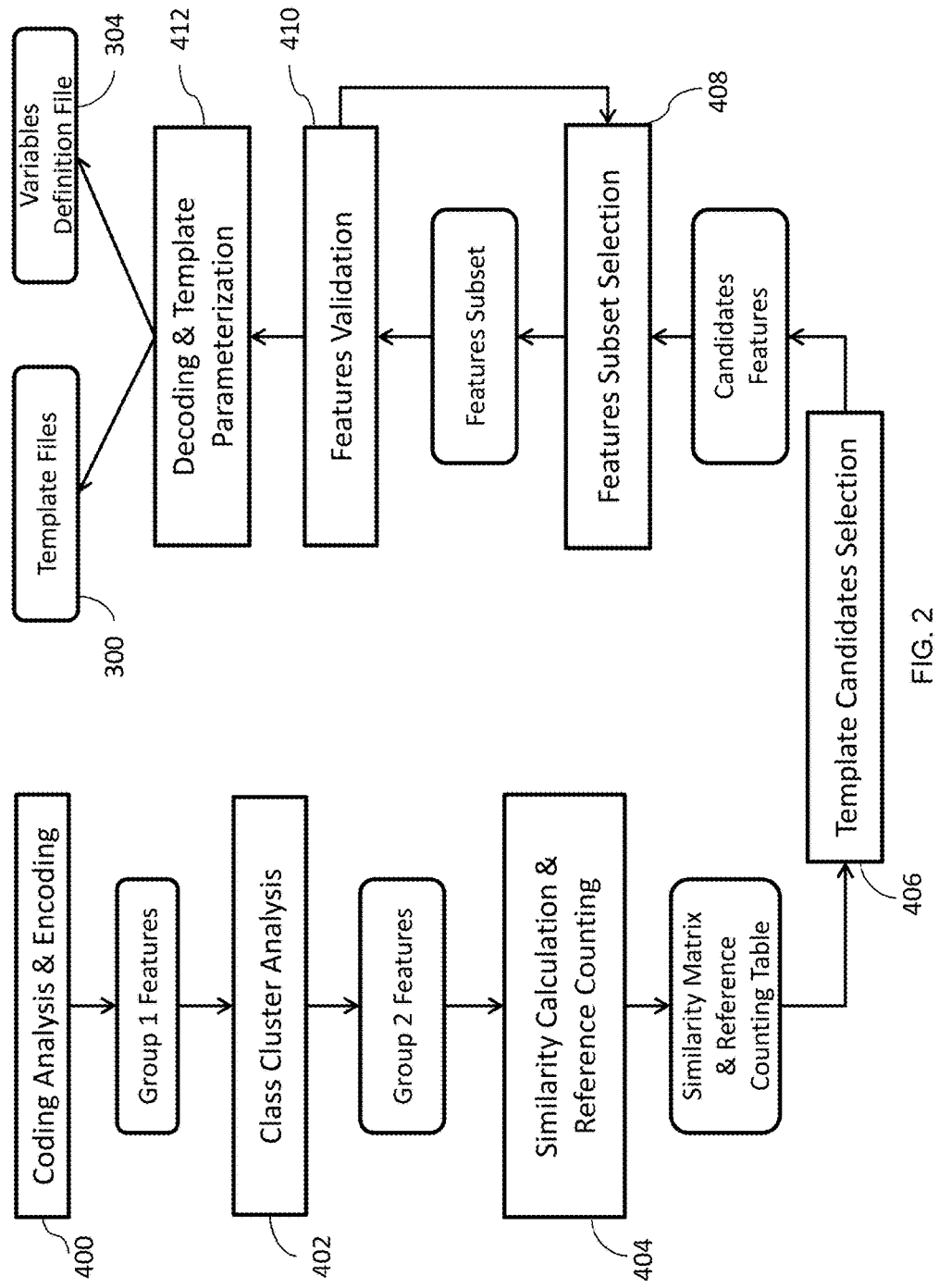
FIG. 2 is a flowchart of a non-limiting illustrative embodiment of the method for template extraction based on source code similarity.

Referring now to FIG. 2, there is a flowchart of a non-limiting illustrative embodiment of the method for template extraction based on source code similarity. At the first step 400, the source code 302 is analyzed and encoded by the Code Analyzer 200. For both the class encoding and decoding steps, the class features are parsed and encoded as float values. Most features are kept and encoded for similarity calculation and parameterization. The sequence of digits in encoding should be decided based on the relevant business rule for similarity calculation.

Figure 3:
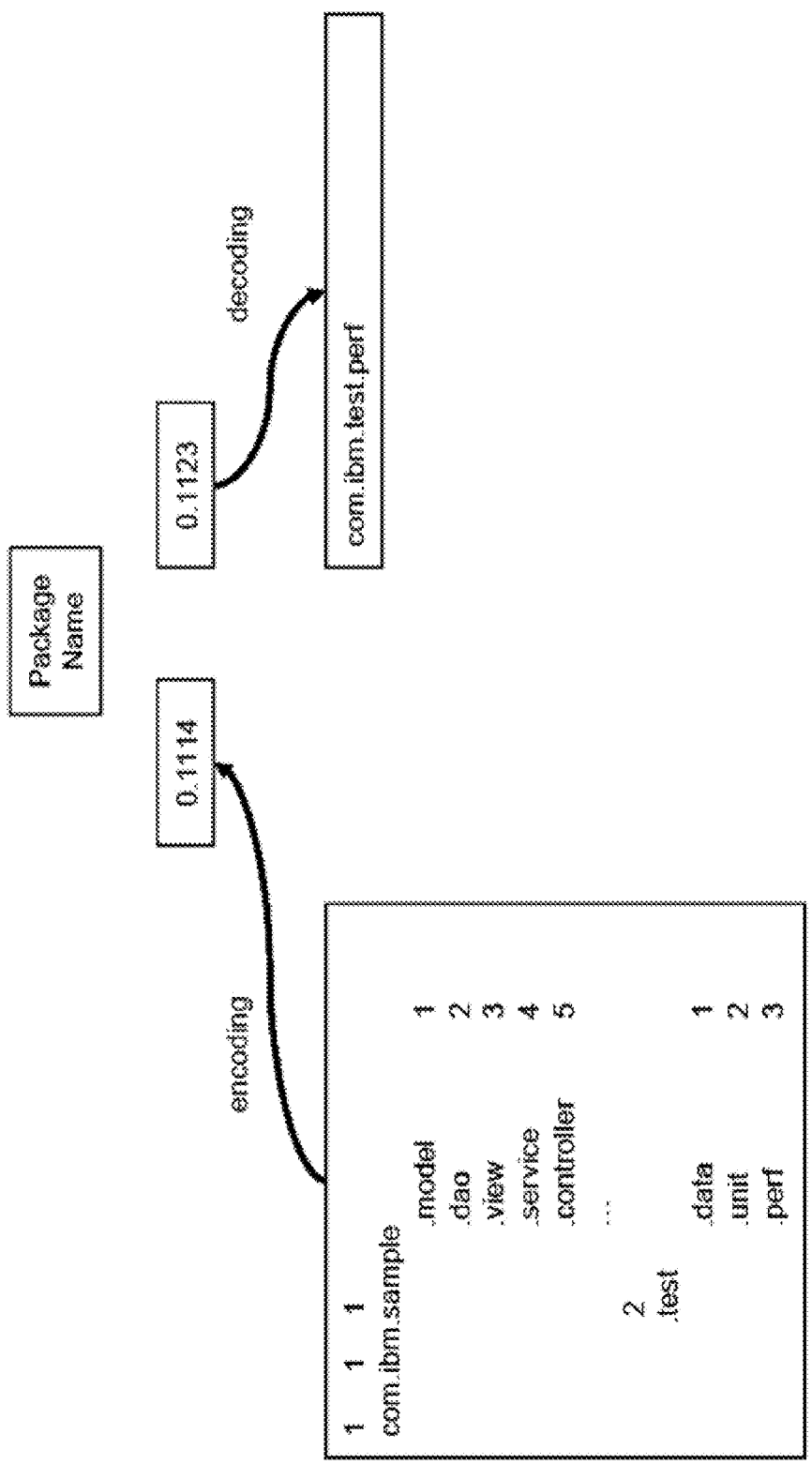
FIG. 3 is a conceptual diagram of a non-limiting illustrative embodiment of the encoding and decoding steps.

Referring briefly to FIG. 3, there is shown a conceptual diagram of a non-limiting illustrative embodiment of the encoding and decoding steps. The depicted embodiment shows an example of the code features encoded as float values during the encoding step. FIG. 3 also shows a template file 300 decoded with the same key-value dictionary. Below is Table 1, comprising a list of exemplary Group 1 and Group 2 features. Group 1 features contain the class summary information which can be used for cluster analysis, while Group 2 features include detailed information which can be used for similarity analysis.

TABLE 1

Exemplary Group 1 and Group 2 Features

| Group 1 | Group 2 |
|---|---|
| Package Name | Package Name |
| Class Definition | Class Definition |
|    name keyword |    name words segments |
|    class type (class/enum/interface) |    access field |
|    Inheritance (super classes ) |    (public/private/protected) |
|    Implementation (interfaces) | Attribute Definition |
| Depends on classes [ ] |    name words segments |
| Depended by classes [ ] |    type |
| ... |    access field |
| |    (public/private/protected) |
| |    static/final |
| | Method Definition |
| |    name words segments |
| |    return type |
| |    static/final |
| |    access field |
| |    (public/private/protected) |
| |    argument type |
| |    . . . |

Figure 4:
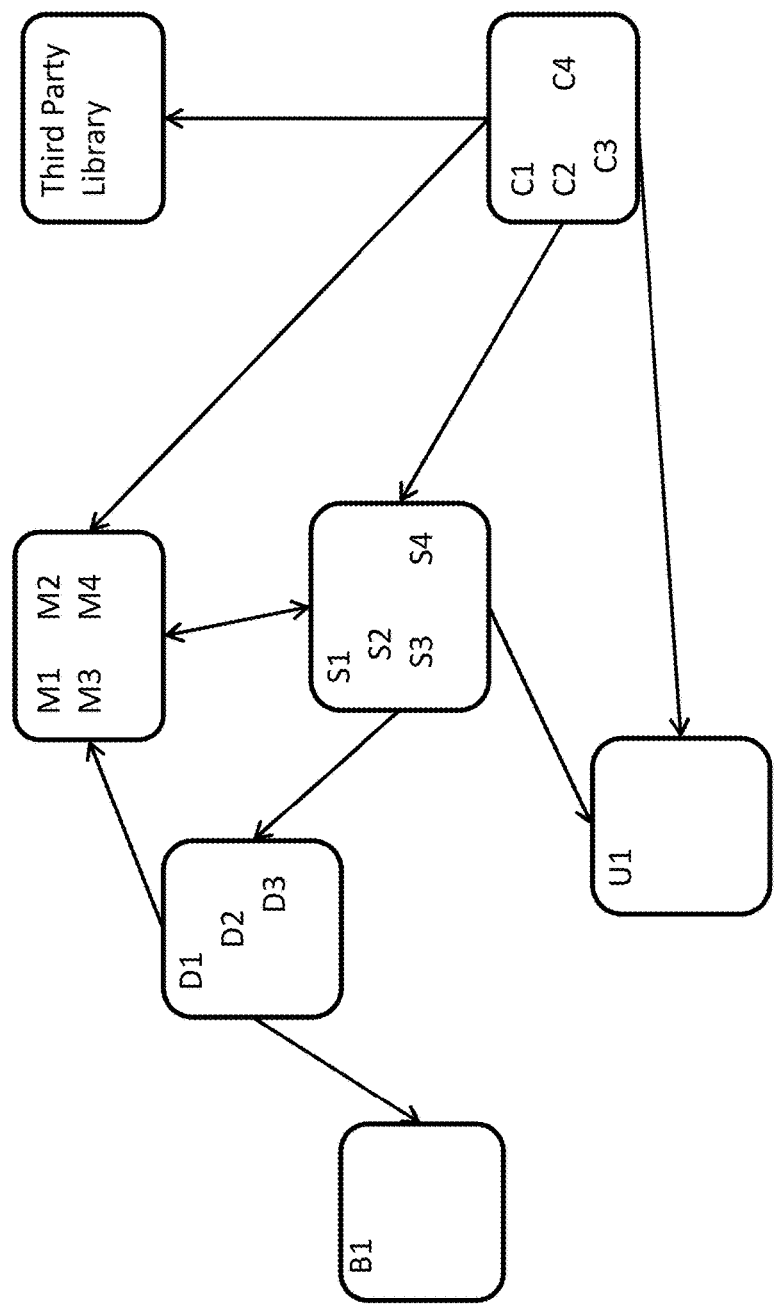
FIG. 4 is a conceptual diagram of a non-limiting illustrative embodiment of a sample result after class cluster analysis.

Referring back to FIG. 2, after the source code 302 is analyzed and encoded, the class clusters are analyzed at the next step 402. Referring briefly to FIG. 4, there is shown a conceptual diagram of a non-limiting illustrative embodiment of a sample result after class cluster analysis. The Similarity Calculator 202 categorizes classes into different clusters according to their roles and responsibilities. Thus, as stated above and shown in Table 1, the classes are organized into clusters based on class summary information in Group 1, such as the name keyword, class type, inheritance, and implementation.

Referring back to FIG. 2, similarity calculation and reference counting by the Similarity Calculator 202 comprise the following step 404. The vector space model (VSM) equation, shown below, is used to calculate the feature similarity among different levels, and the general similarity is a weighted result of the similarity of different levels. Table 1 above provides exemplary Group 2 features which can be used for similarity analysis.

$$Sim(d_i, d_j) = \cos\theta = \frac{\sum_{k=L}^{n} w_k(d_i) \times w_k(d_j)}{\sqrt{\left(\sum_{k=L}^{n} w_k^2(d_i)\right)\left(\sum_{k=L}^{n} w_k^2(d_j)\right)}}$$

The general similarity is calculated as follows:

General Similarity=L1 similarity*L1 weight+L2 similarity*L2 weight+Ln similarity*Ln weight.

Figure 9:
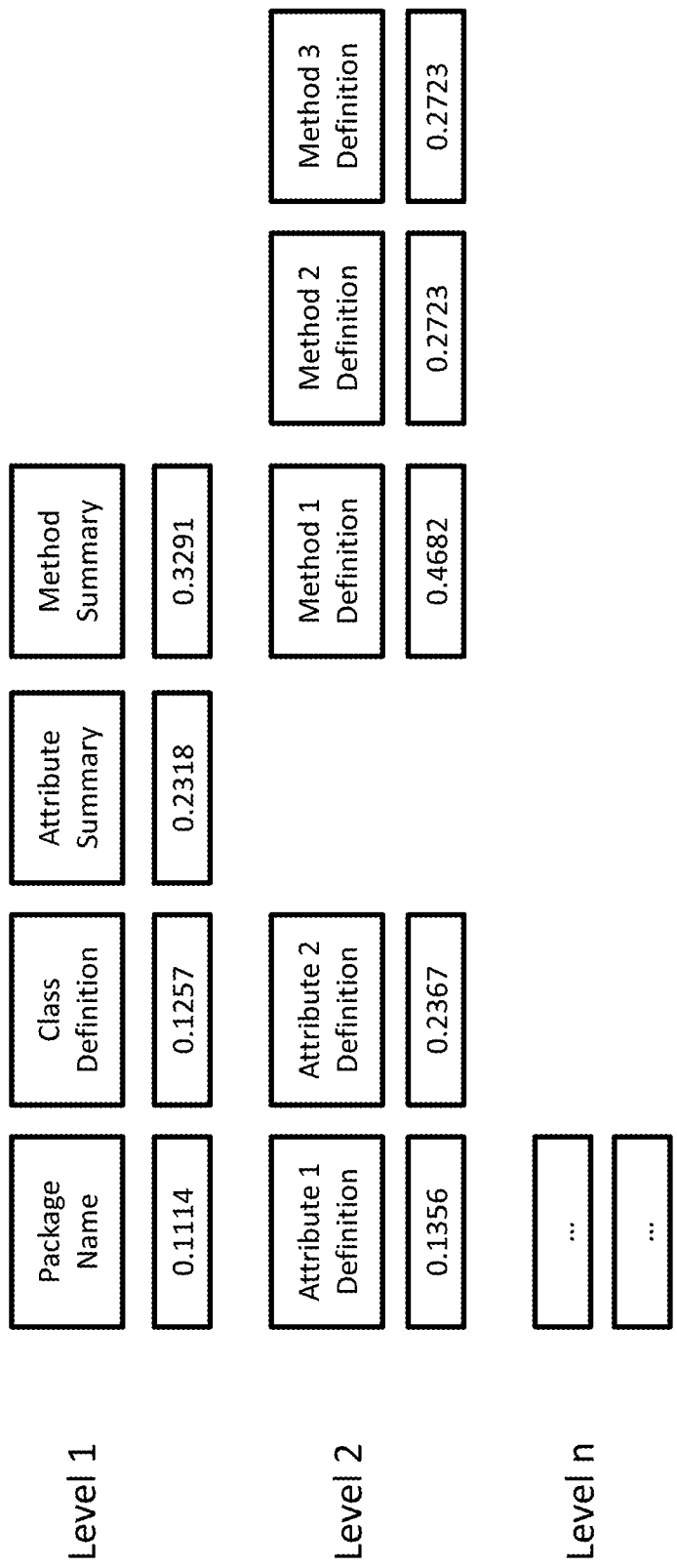
FIG. 9 is a table of a non-limiting illustrative embodiment of features at different levels, each encoded with float values.

Referring briefly to FIG. 9, there is shown a table with an example of the features at different levels, each encoded with float values, which can be used in the VSM equation above.

Figure 5:
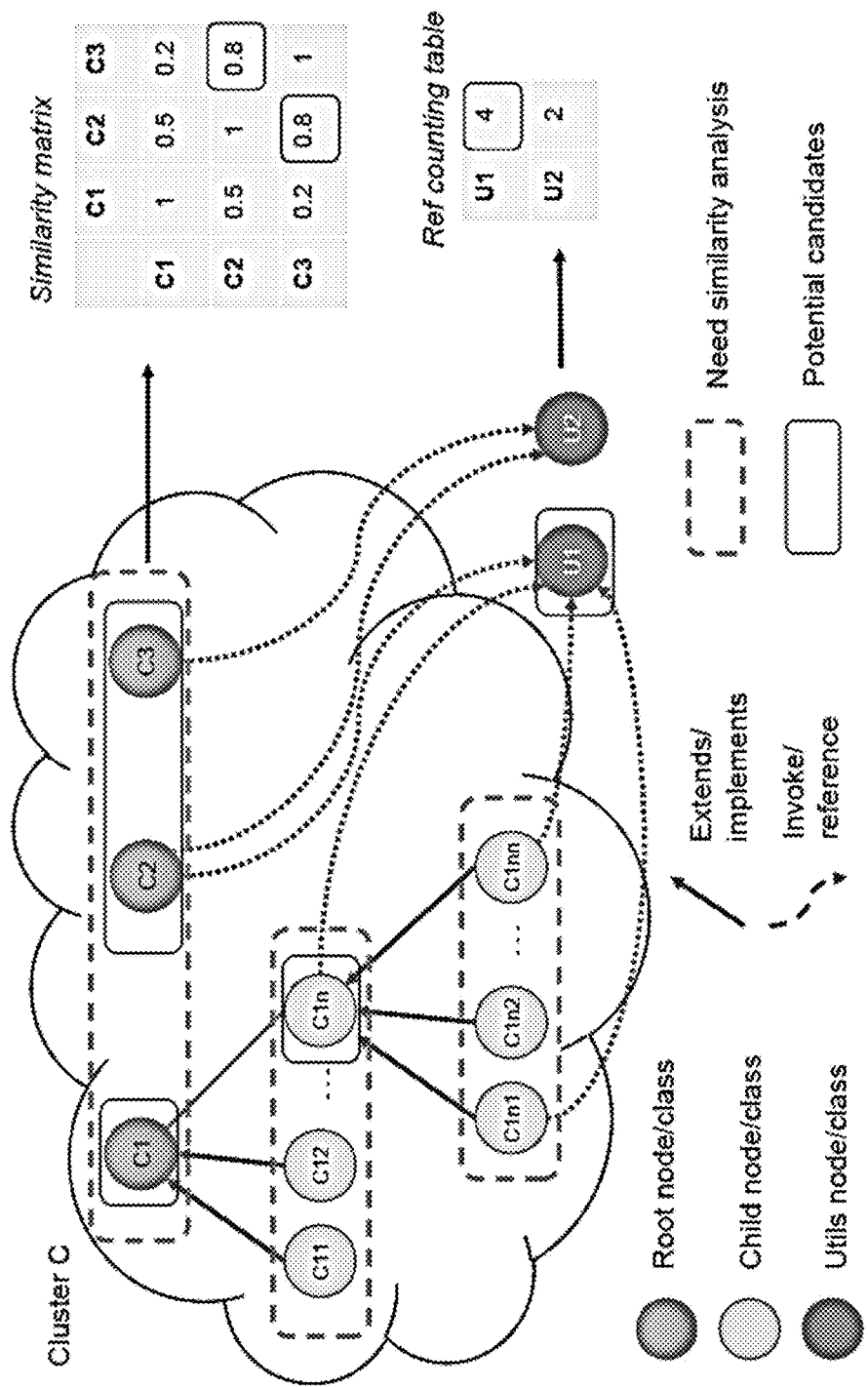
FIG. 5 is a conceptual diagram of a non-limiting illustrative embodiment of a similarity matrix and a reference counting table.

Referring now to FIG. 5, there is shown a diagram of a non-limiting illustrative embodiment of a similarity matrix and a reference counting table. In the depicted embodiment, the classes within each cluster are identified for similarity analysis. As shown, classes C1, C2, and C3 are each analyzed for similarity with the remaining classes in the cluster. A similarity matrix is constructed with the similarity between each class in the cluster. The Similarity Calculator 202 also counts the references for each class and constructs a reference counting table, as shown.

Referring back to FIG. 2, after the similarity calculation and reference counting, the next step 406 is template candidate selection. Templates 300 can be extracted from three types of potential candidates: similar classes, parent classes, and utility classes. First, potential candidates are chosen from each class based on their high similarities, such as C2 and C3 in FIG. 4. Second, potential candidates are chosen based on a parent-child relationship, such as C1 and C1n in FIG. 4. Third, the potential candidates are also selected if they have a high reference count, such as U1 in FIG. 4.

Figure 6:
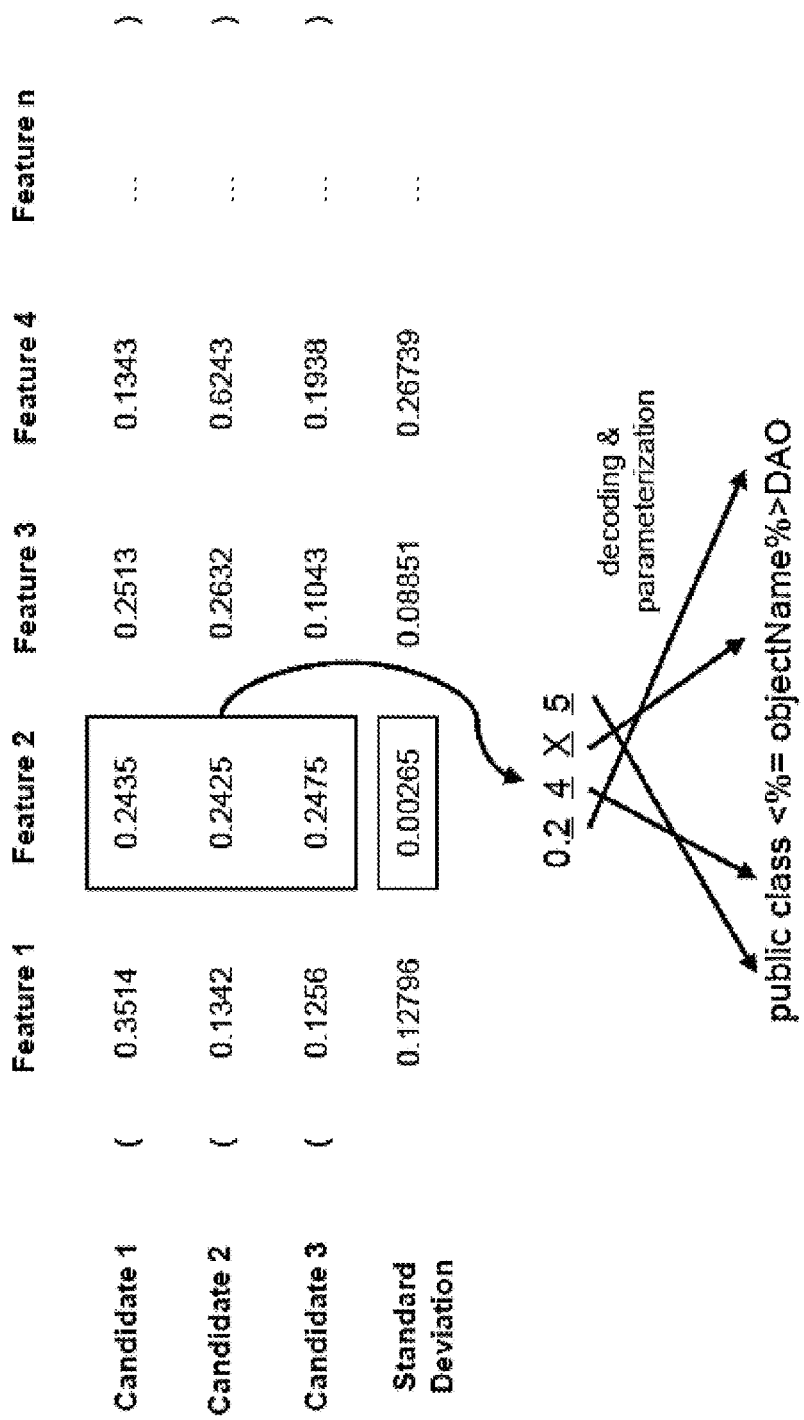
FIG. 6 is a conceptual diagram of a non-limiting illustrative embodiment of feature subsets.

At the following step 408, after candidates are selected, a features subset is selected across all selected candidates. Referring briefly to FIG. 6, there is shown a diagram of a non-limiting illustrative embodiment of feature subsets. The Template Extractor 204 selects a feature subset according to the similarity between the feature values of the candidates. To accomplish this, the naming convention and programing guides are loaded, serving as reference materials. The differences among Group 2 features (from Table 1), such as class names, attributes, and function signatures, for example, are determined.

As shown in FIG. 6, the differences mentioned above are quantified as a standard deviation calculated for the feature values of the candidates for each feature subset. The smaller the standard deviation, the more similar the candidates in the subset are for that feature. When the standard deviation is smaller, the more suited the feature is to be used for template extraction. Using the embodiment shown in FIG. 6 as an example, the candidates have the lowest standard deviation for "Feature 2" and therefore, Feature 2 would be used for template extraction.

Referring back to FIG. 2, at the proceeding step 410, the features in the selected features subset are then validated. If they are not validated, another feature subset is selected. Finally, after the features are validates, they are decoded and parameterized to generate a template file 300 and a corresponding variable definition file 304. At this final step 412, the imported or referenced domain model, business service, and utility classes are analyzed. The float value, i.e., package name or namespace, is parameterized, if applicable. As shown in FIG. 6, the float values vary across all candidates by one number in the same position. This different number is parameterized with the variable "X". The features and corresponding variables are copied into a variable definition file 304 for use during code generation. There may be instances and embodiments where the standard deviation is zero and there is no difference in the float value across all selected candidates. In such a case, the float value would not be parameterized.

Figure 7:
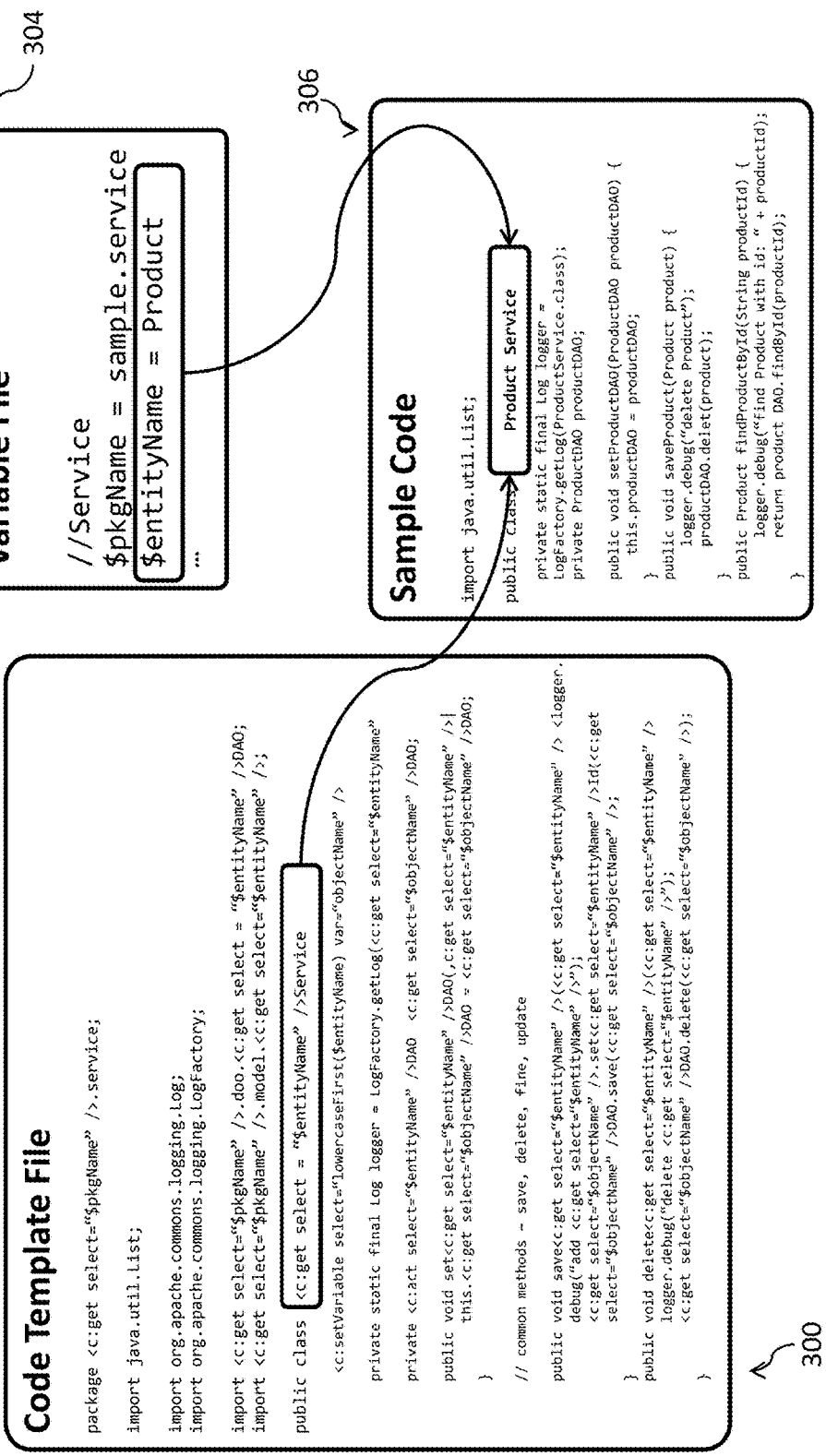
FIG. 7 is a conceptual diagram of non-limiting illustrative embodiment of source code generation.

If there is parameterization, the domain model and business service are parameterized as well. Finally, a class template 300 is generated with the domain model, business service, and/or package/namespace variable definition file 304. The output is a set of code template files 300 with static statements and dynamic expressions, and variable definition files 304 used for code generation. Referring now to FIG. 7, there is shown a diagram of non-limiting illustrative embodiment of source code 306 generation. After the template 300 is generated, the user needs to input/configure the variable definition file 304 directly or via a customized user interface and generate the source code 306 accordingly. As shown in FIG. 7, the template 300 is used and the variables in the template 300 are filled in with a corresponding feature from variable definition file 304 to produce the source code 306.

Figure 8:
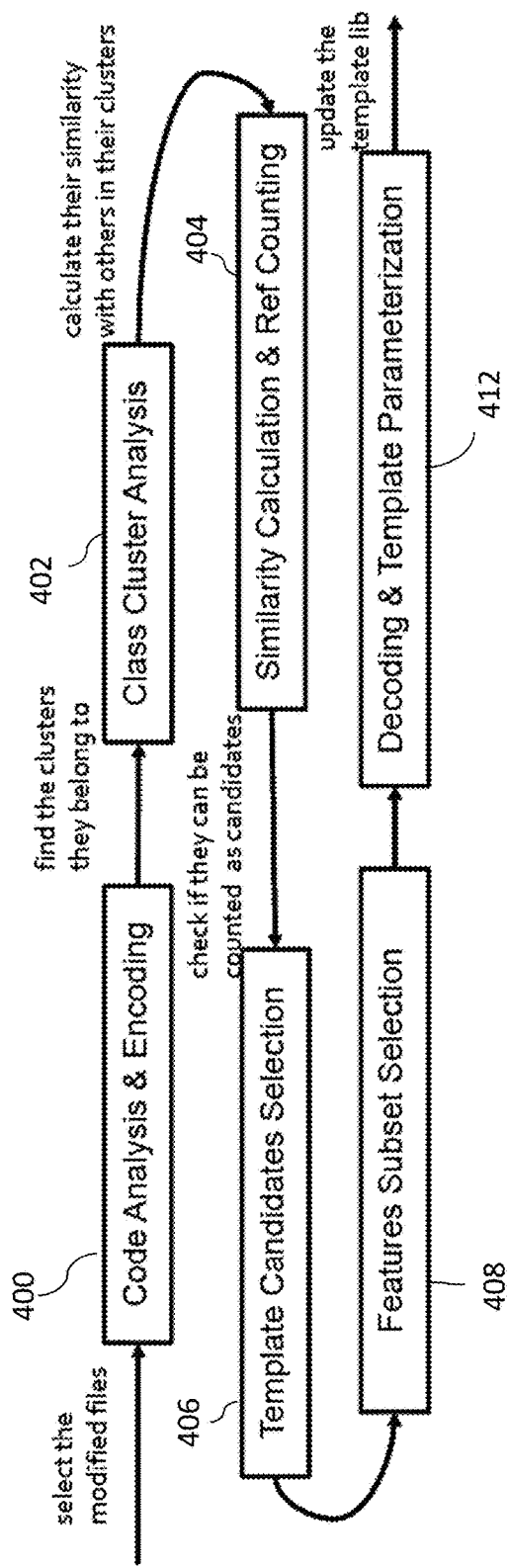
FIG. 8 is a flowchart of a non-limiting illustrative embodiment for a method for improving the template.

In most embodiments, the template files 300 are maintained by the class clusters. Referring now to FIG. 8, there is shown a flowchart of a non-limiting illustrative embodiment for a method for improving the template(s). One method for improving the templates 300 is to re-calculate the code similarity and re-extract templates of all the source code files. Another method involves improving the template 300 on an incremental basis. For example, if a portion of the source code file is modified, they can be re-encoded and their code similarity recalculated according to flowchart shown in FIG. 8.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A computer processing system for template extraction based on source code similarity, comprising:
   a computer processor having a non-transitory memory containing program code which when executed causes the processer to perform:
   receiving source code having class files;
   classifying the class files into classes based on at least one of naming rules and inheritance hierarchy;
   parsing a first group of features and a second group of features for each class;
   encoding each feature from the first group and the second group with a float value;
   clustering classes based on similarities of the first group of features;
   assigning an identifier based on a quantitative indicia for classes in a cluster;
   identifying candidate classes within the cluster based on at least one of the quantitative indicia and inheritance hierarchy;
   selecting a feature subset across all candidate classes based on the float value;

determining one or more differences in the features in the feature subset;

decoding the features in the feature subset;

assigning a variable to the differences in the features in the feature subset;

importing a domain model;

parameterizing the domain model with the variable; and generating a template with the domain model.

2. The system of claim 1, wherein the quantitative indicia is a similarity value.

3. The system of claim 2, wherein the similarity value is calculated with a vector space model.

4. The system of claim 3, wherein the similarity value represents similarities between the second group of features of each class in a cluster.

5. The system of claim 4, wherein the second group of features comprises at least one of class definitions, attribute definitions, and method definitions.

6. The system of claim 1, wherein the first group of features comprises at least one of class attributes, function signature, and body.

7. The system of claim 1, wherein the quantitative indicia is a reference count.

8. The system of claim 1, further comprising program code for generating a variable definition file.

9. The system of claim 8, wherein the variable definition file comprises a listing of each variable associated with the difference in features in the feature subset.

10. The system of claim 1, further comprising the step of calculating a standard deviation for each feature subset.

11. The system of claim 10, wherein the standard deviation measures the similarity of the float values for the features in the feature subset.

12. The system of claim 1, wherein the source code is project source code with object-oriented programming language.

13. The system of claim 1, wherein a sequence of digits representing the float values is determined by a business rule for similarity calculation.

14. The system of claim 1, further comprising program code for loading naming conventions and programming guides as reference materials.

15. A method for template extraction based on source code similarity, comprising the steps of:

receiving source code having class files;

classifying the class files into classes based on at least one of naming rules and inheritance hierarchy;

parsing one or more features for each class;

encoding each feature with a float value;

clustering classes based on similarities of the features;

assigning an identifier based on a quantitative indicia for classes in a cluster;

identifying candidate classes within the cluster based on at least one of the quantitative indicia and inheritance hierarchy;

selecting a feature subset across all candidate classes based on the float value;

determining one or more differences in the features in the feature subset;

decoding the features in the feature subset;

assigning a variable to the differences in the features in the feature subset;

importing a domain model;

parameterizing the domain model with the variable; and generating a template with the domain model.

16. The method of claim 15, wherein the quantitative indicia is a reference count or a similarity value.

17. The method of claim 15, further comprising the steps of:

generating a variable definition file with the variable cross-referenced with the differences in the feature; and generating source code using the template and the variable definition file.

18. A computer program product providing template extraction based on source code similarity, the computer program comprising a computer readable storage medium having program instructions embodied therewith, wherein the computer readable storage medium is not a transitory signal per se, the program instructions are readable by a computer to cause the computer to perform a method comprising the steps of:

receiving source code having class files;

classifying the class files into classes based on at least one of naming rules and inheritance hierarchy;

parsing one or more features for each class;

encoding each feature with a float value;

clustering classes based on similarities of the features;

assigning an identifier based on a quantitative indicia for classes in a cluster;

calculating a similarity value between each class within a cluster;

identifying candidate classes within the cluster based on the similarity value;

selecting a feature subset across all candidate classes based on the float value;

determining one or more differences in the features in the feature subset;

decoding the features in the feature subset;

assigning a variable to the differences in the features in the feature subset;

importing a domain model;

parameterizing the domain model with the variable; and generating a template with the domain model.

19. The method of claim 18, further comprising the step of re-calculating the similarity value for the source code.

20. The method of claim 18, further comprising the steps of:

re-encoding a portion of the source code that has been modified; and re-calculating the similarity value for the portion of the source code.

* * * * *